United States Patent
Karrer

(10) Patent No.: US 6,203,078 B1
(45) Date of Patent: Mar. 20, 2001

(54) BUMPER FOR UTILITY VEHICLE

(76) Inventor: Robert B. Karrer, 3489 Fulton Avenue, Smithers, British Columbia (CA), V0J 2N0

( * ) Notice: Subject to any disclaimer, the term of this patent is extended or adjusted under 35 U.S.C. 154(b) by 0 days.

(21) Appl. No.: 09/143,391

(22) Filed: Aug. 28, 1998

Related U.S. Application Data

(63) Continuation-in-part of application No. 08/807,752, filed on Feb. 27, 1997, now Pat. No. 5,882,058.

(51) Int. Cl.[7] .................................................. B60R 19/48
(52) U.S. Cl. .................... 293/111.1; 293/114; 293/146
(58) Field of Search ................... 293/102, 111.1, 293/114, 117, 141, 146–148, 115; D12/169

(56) References Cited

U.S. PATENT DOCUMENTS

| | | | |
|---|---|---|---|
| 1,487,105 | * 3/1924 | Kawasaki | D12/169 |
| 3,858,924 | * 1/1975 | Bores | 293/117 |
| 4,419,038 | * 12/1983 | Pendergraft | 293/117 |
| 4,635,983 | * 1/1987 | Boland et al. | 293/111.1 |
| 4,735,448 | * 4/1988 | Hart | 293/117 |
| 4,738,464 | * 4/1988 | Putnam | 293/117 |
| 4,961,604 | * 10/1990 | Kisner | 293/117 |
| 5,139,296 | * 8/1992 | Bundy | 293/117 |

* cited by examiner

Primary Examiner—Sherman Basinger
(74) Attorney, Agent, or Firm—Christopher R. Scott

(57) ABSTRACT

The invention provides a bumper for a pickup truck or other utility vehicle and which can be adapted to receive and support an accessory such as a crane, winch or carrying rack. The bumper includes an elongate rigid support frame for positioning transversely of the length of the truck, support frame having a vertically extended central portion, and tapered side portions. Optionally, at least one accessory receiver is rigidly attached to the support frame for receiving and supporting an accessory. Bracket members are rigidly attached to the frame for attachment to a vehicle. The bumper resists downward rotational and translational deflection relative to a utility vehicle when an accessory is in use on the bumper.

14 Claims, 5 Drawing Sheets

BUMPER FOR UTILITY VEHICLE

This application is a continuation-in-part of application Ser. No. 08/807,752 filed on Feb. 27, 1997 now U.S. Pat. No. 5,882,058.

FIELD OF THE INVENTION

The present invention relates to pickup trucks and other utility vehicles, and more particularly to bumpers for such vehicles.

BACKGROUND OF THE INVENTION

There are many accessories for use on pickup trucks and other utility vehicles to enhance their utility including overhead carrying racks, cranes, winches, and hitches. In the case of pickup trucks, for example, many of these accessories are commonly affixed to the cargo bed. However, it is often desirable to use the cargo bed for storing and/or transporting cargo and a need arises for maximizing the space available for this purpose. Further, some accessories, such as cranes and hitches, must be located on the pickup truck when in use. It is therefore desirable to utilize a bumper having improved strength and rigidity so that it can be used to attach useful accessories.

SUMMARY OF THE INVENTION

The invention provides a bumper for a utility vehicle such as a pickup truck. The bumper has enhanced strength and rigidity and an elongate rigid support frame for extending laterally relative to a longitudinal axis of the utility vehicle, the support frame having a vertically extended central portion, and tapered side portions extending from the central portion outwardly to respective outer ends of the frame.

The bumper may include an accessory receiver rigidly attached to the support frame for receiving and supporting an accessory and a bracket member rigidly attached to upper and lower portions of the extended central portion for coupling the bumper to a rear of the vehicle such that the support frame resists downward rotational and translational deflection when an accessory is placed in the receiver.

BRIEF DESCRIPTION OF THE DRAWINGS

Embodiments of the invention will now be described with reference to the drawings in which.

DETAILED DESCRIPTION OF THE PREFERRED EMBODIMENTS

Figure 1:
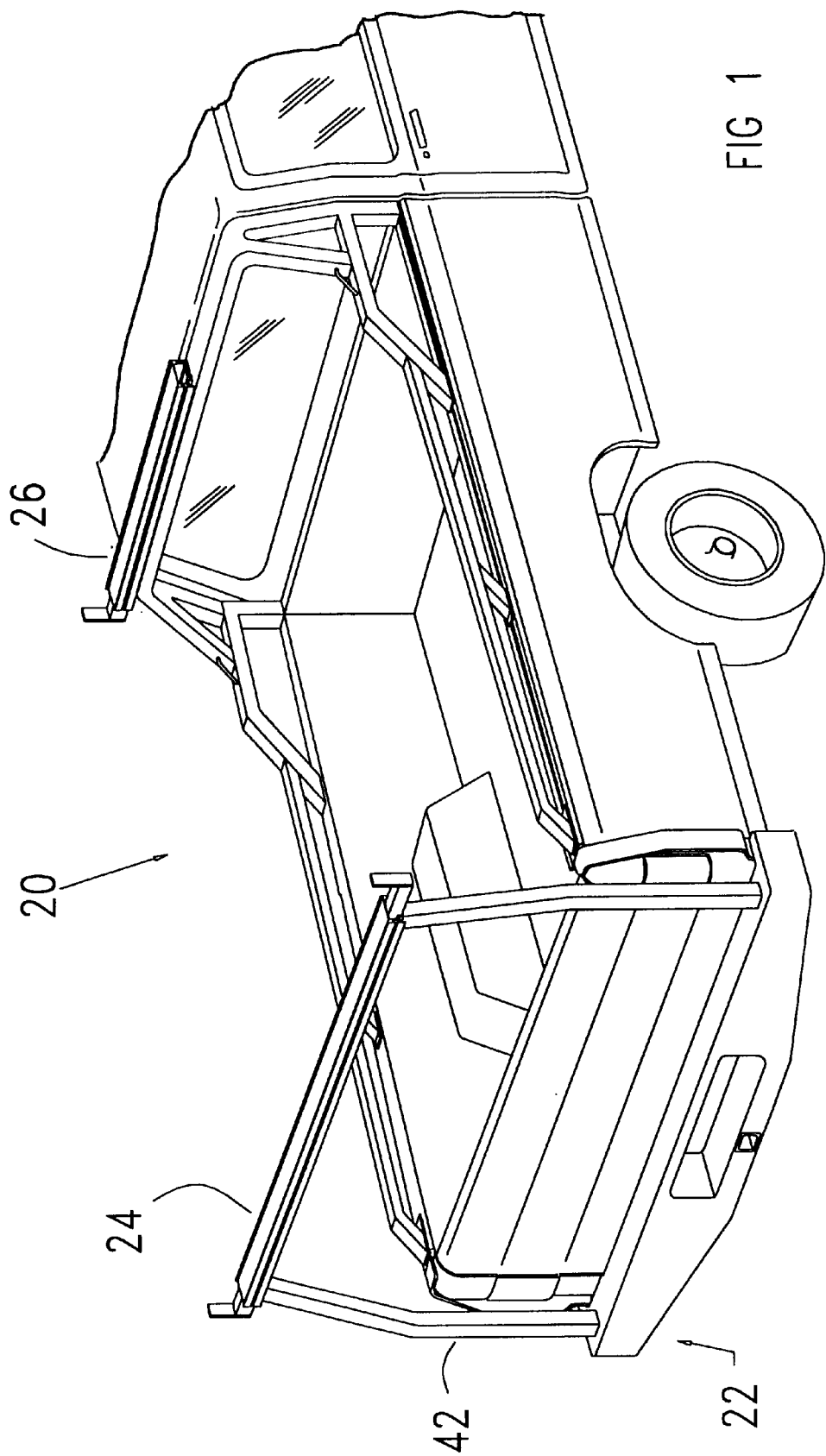
FIG. 1 is an exploded isometric view of a rear part of an exemplary pickup truck having a bumper according to a first preferred embodiment of the present invention and shown in an exemplary use supporting a rear carrying rack which complements a forward overhead carrying rack behind the cab of the pickup truck.

Referring now to the drawings, FIG. 1 illustrates a conventional pickup truck designated generally by the numeral 20 and including a bumper designated generally by numeral 22 according to a first preferred embodiment of the invention mounted to the pickup truck 20. The bumper 22 is shown in an exemplary use receiving and supporting an accessory in the form of a rear carrying rack 24 which is typically used with a forward carrying rack assembly 26. Due to its structural features, as will be described in more detail below, the bumper 22 is effective in bearing the load of the rear carrying rack 24 and any objects to be carried on the carrying rack 24 by resisting downward rotational and translational deflection relative to the pickup truck 20.

Figure 2:
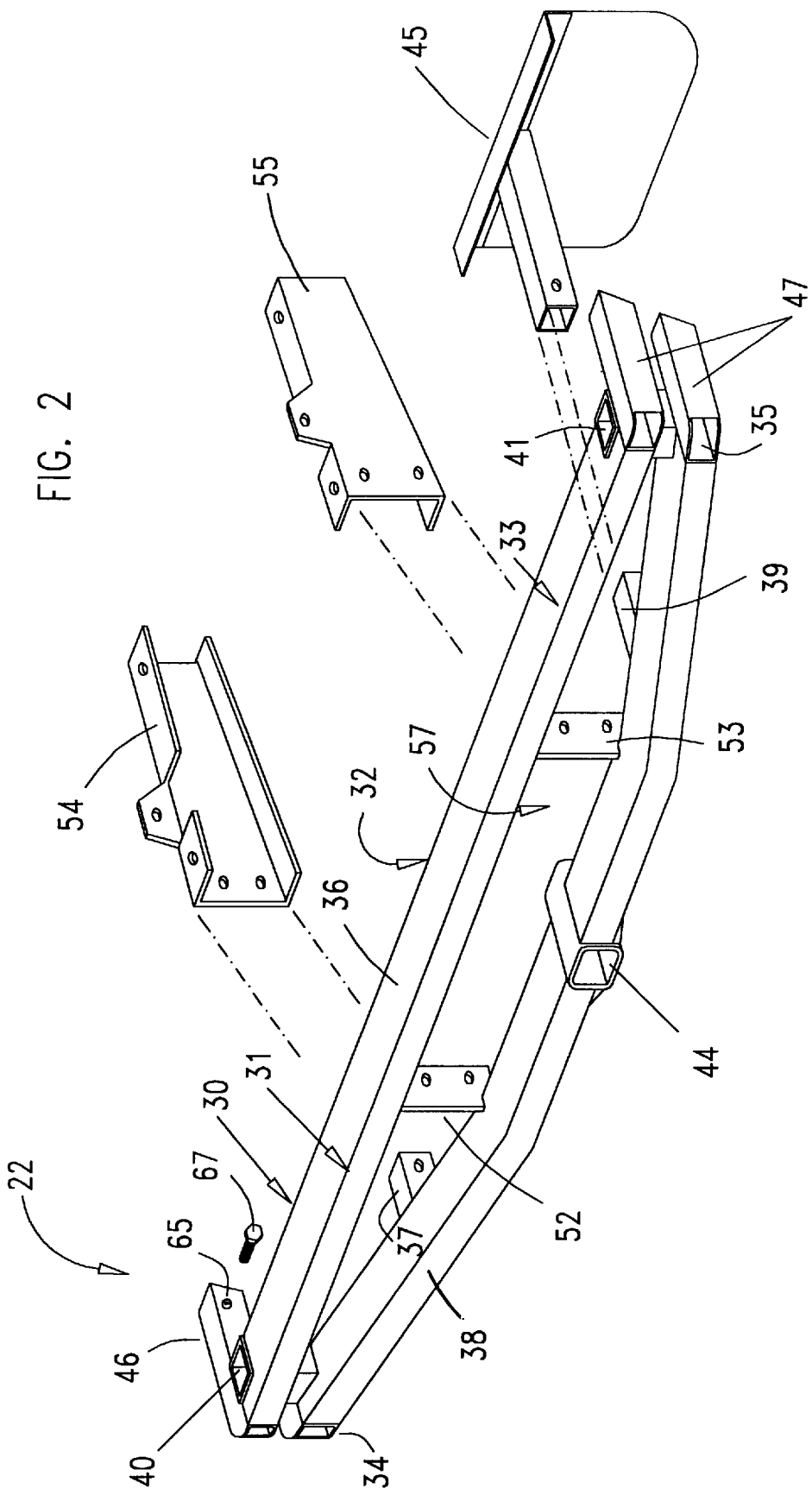
FIG. 2 is an exploded isometric view of the internal structure of the bumper of FIG. 1 and further showing truck frame mounting plates and a removable mud flap assembly.

As can be seen with reference to FIG. 2, the internal structure of the bumper 22 includes an elongate rigid support frame designated generally by numeral 30 which is made up of welded components. The frame is made to extend transversely of the length of the truck and has a vertically extended central portion 32 and side portions 31, 33 extending one to each side of the central portion 32. The portions 31, 33 are tapered from the central portion 32 towards respective outer ends 34, 35. The support frame 30 has a first hollow cross-member in the form of unitary top beam 36 and a second hollow cross-member in the form of a two-part bottom beam 38 welded to a hitch receiver 44. Both beams 36, 38 are effectively continuous between the outer ends 34, 35 and combine to define the central portion 32 and tapered side portions 31, 33. In order to provide these portions, the top beam 36 is preferably straight and the two parts of beam 38 are bent to converge with the beam 36 towards the respective outer ends 34, 35.

Accessory receivers in the form of two vertically arranged square pockets 40, 41 are welded to the top and bottom beams 36, 38 to define the respective outer ends 34, 35 of the support frame 30 and to accept, among other attachments, vertical posts 42, 43 of rear carrying rack 24 (FIG. 1). Further accessory receivers include the horizontally extending square tubing receiver 44 which is welded into the two similar sections of the bottom beam 38 to locate the receiver 44 centrally. The receiver 44 is adapted to accept a standard towing hitch.

Other accessory receivers depend from the bottom beam 38. A pair of forwardly projecting and horizontally extending tubes 37, 39 are welded to the bottom beam 38 for receiving removable mud flap assemblies, only one mud flap assembly 45 being shown.

Figure 3:
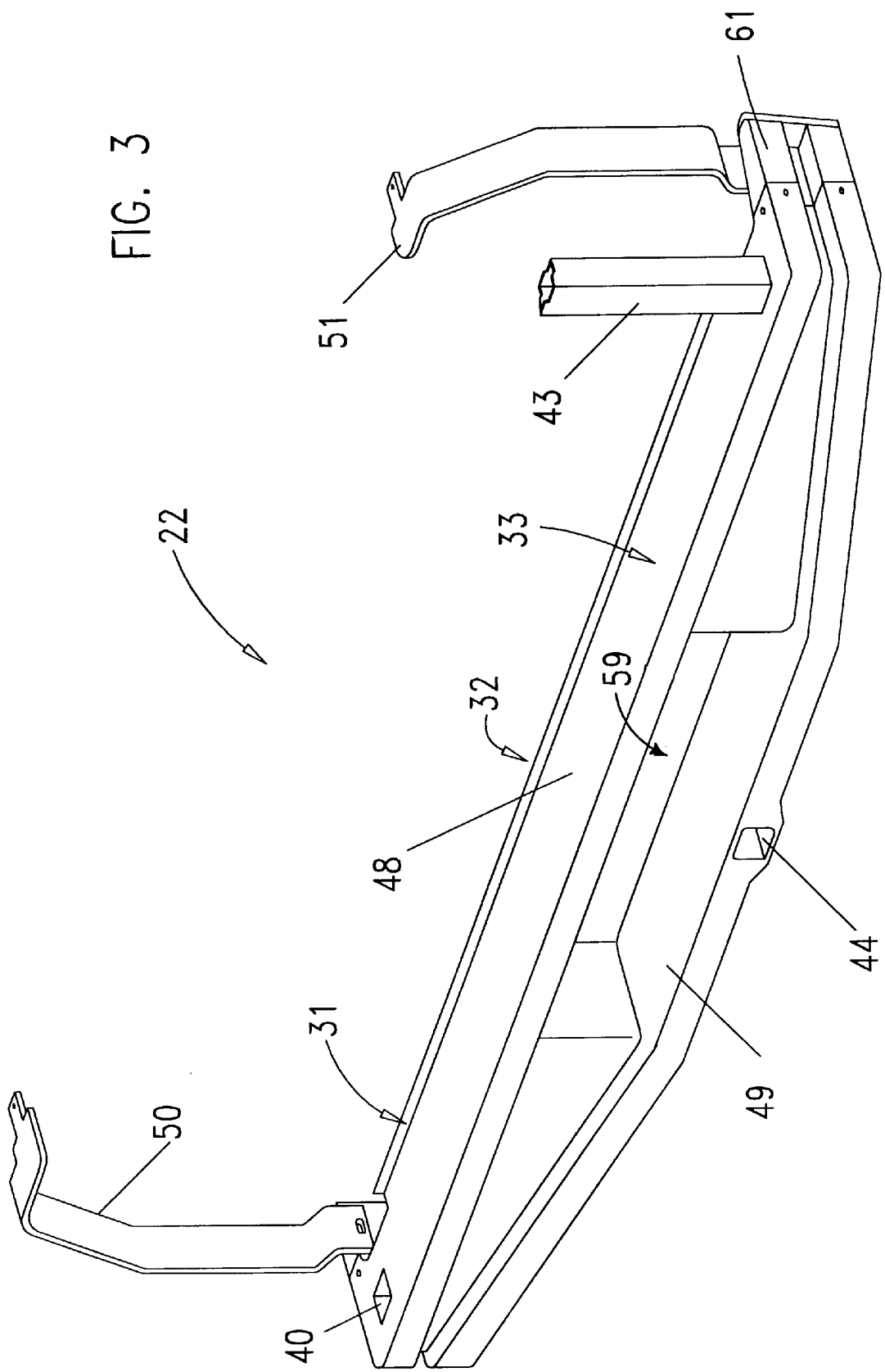
FIG. 3 is an isometric view of the bumper of FIG. 1 showing the attachment of tail light protectors.

The outer ends 34, 35 of the support frame 30 include respective pairs of horizontally affixed tubes 46, 47 extending forwardly for use in bracing a molded cover skin 48 (FIG. 3) to the frame 30 as part of the bumper 22, and to provide threaded openings 65 (one of which is seen) which combine with bolts 67 to attach tail light protectors 50, 51 (see FIG. 3).

The support frame 30 is attached to a pickup truck or the like using vertically extending bracket members 52, 53 in the form of a pair of vertically affixed plates which are rigidly attached to the top and bottom beams 36, 38 to either side of the square tubing receiver 44 and intermediate the outer ends 34, 35. The bracket members 52, 53 are designed to accept truck frame mounting plates 54, 55 for mounting the support frame 30 to the pickup truck 20. When so mounted, the top and bottom beams 36, 38 and bracket members 52, 53 together define a gap 57 for exposing a licence plate of the pickup truck 20. The bottom beam 38 can be used as a step by a person entering or reaching into the pickup truck 22 from the rear.

The bumper 22 thus described includes a variety of accessory receivers for rendering the bumper more versatile and useful than conventional bumpers. The rigid welded support frame 30 thus described with the extended central portion 32 and bracket members 52, 53 connecting the central portion 20 to the truck frame mounting plates 54, 55 is very strong and resistant to downward deflection relative to the rear 28 of the pickup truck 20 when subjected to loads. The hollow tubular components of the support frame 30 contribute to the strength of the bumper 22 while allowing the weight to be minimized.

Referring now to FIG. 3, the optional cover skin 48 improves the appearance of the pumper 22. The skin is made of a thermoplastic or other suitable material formed to fit the contours of the welded assembly and to provide an indented step 49 for use in reaching into or entering the pickup truck 20 from the rear. This step is supported by the support frame 30 and especially the bottom beam 38 (FIG. 2) and is easy to keep clean in use. The cover skin 48 further provides a licence plate pocket 59 which not only ensures that the licence plate is visible but also protects it against dirt and other debris. Interlocking removable end covers (only end cover 61 being shown) can be added to the skin 48 to close the end for improved appearance. The tail light protectors 50, 51 are releasably attached to the tubes 46, 47 of the support frame 30 using bolts 67 in openings 65 (one of each being shown in FIG. 2.).

The bumper 22 has many advantages. Firstly, the vertically extended central portion 32 combined with the side portions 31, 33 provide a structure which is inherently rigid and resists deflection caused by downward and/or torsional loading. This combined with the assembly on a vehicle results in a very rigid bumper. This rigidity can be used advantageously to support attachments for accessories as described in the foregoing example.

Another advantage is that the frame 30 lends itself to receiving the cover skin 48 without compromising the strength of the bumper 22.

It will be appreciated that the frame can be modified within the scope of the invention. For instance, the extent of the central portion 32 could be varied and this could result in the bracket members 52, 53 being attached to the respective side portion 31, 33.

Figure 4:
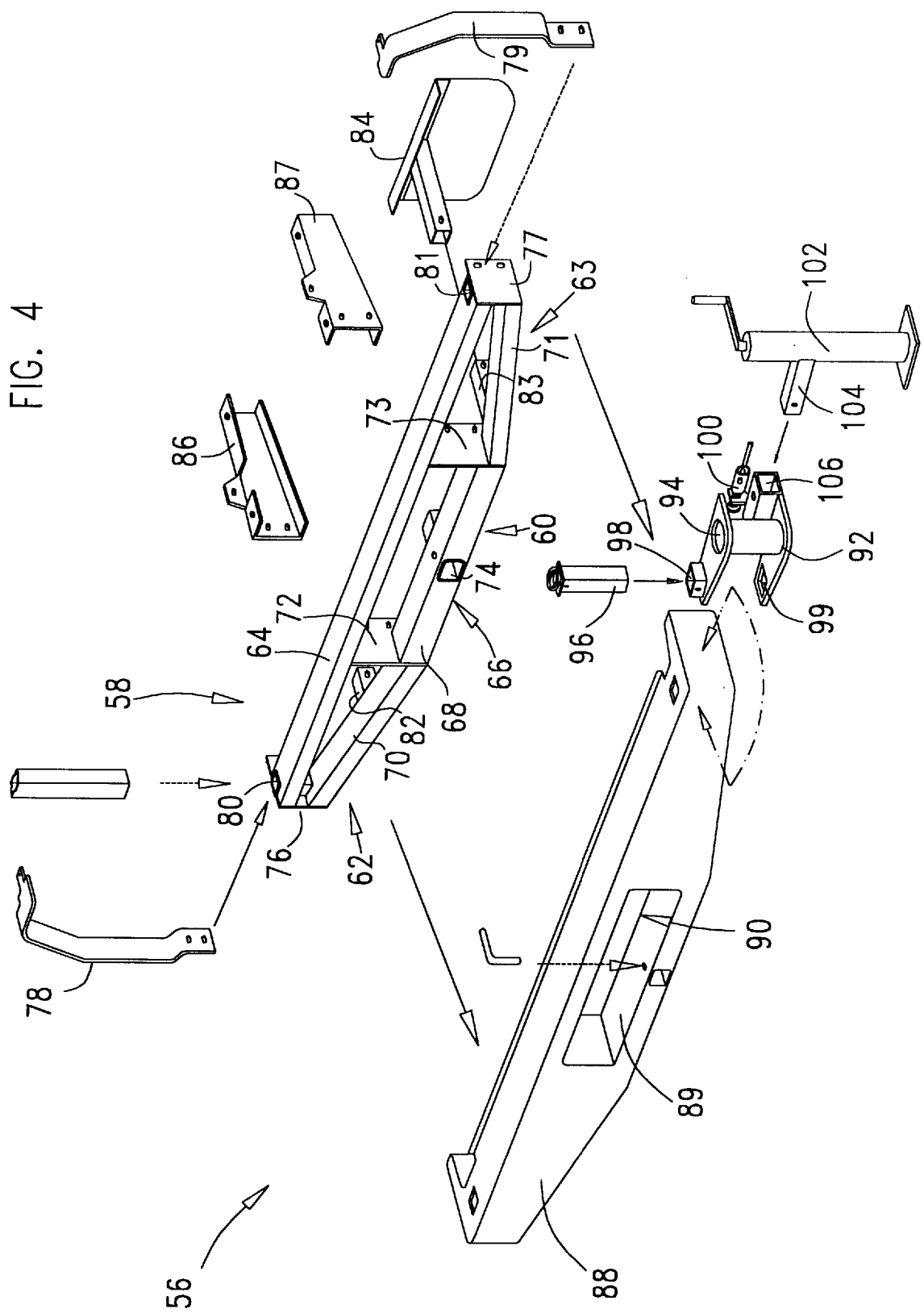
FIG. 4 is an exploded isometric view of a bumper according to a second preferred embodiment of the invention also showing an accessory for use with the bumper.

Referring to FIG. 4, a bumper designated generally by numeral 56 according to a second preferred embodiment of the invention is shown. The bumper 56 is similar to the bumper 22 of the first preferred embodiment in many respects and includes a support frame designated generally by numeral 58 having a central vertically extended portion 60 and side portions 62, 63. A top beam 64 is straight and a bottom beam 66 is made up of a horizontally-extending square central tube 68 and outward square tubes 70, 71 with the central tube 68 and respective tubes 70, 71 welded to opposite sides of a pair of vertical plates 72, 73. These plates 72, 73 extend upwardly and are welded to the underside of the top beam 64.

The central tube 68 is of a larger cross-section than the cross-sections of the outward square tubes 70, 71 and accommodates a square tubing receiver 74 welded to the central tube 68 and extending therethrough.

The support frame 58 further includes mounting plates 76, 77 at outer ends of the support frame 58 for receiving tail light protectors 78, 79.

Similar to the first preferred embodiment, the bumper 56 includes a pair of vertically placed square pockets 80, 81 located at the respective outer ends of the support frame 58 and a pair of horizontally-extending tubes 82, 83 for receiving removable mud flap assemblies 84, one of which is shown.

Also in similar fashion, the bumper 56 can be fixed to the rear of the pickup truck 20 (FIG. 1) by attachment of the vertically affixed plates 72, 73 to the truck frame mounting plates 86, 87. A cover skin 88 is dimensioned to releasably engage the support frame 58, and which defines an indented step 89 and licence plate guard 90. In this embodiment the one-piece skin 88 is fabricated from sheet steel for strength and to meet the requirements of more rugged use.

Accessories, such as a crane, as will be described, can be mounted on the bumper 56 using an attachment bracket 92. This bracket 92 has an upright tubular receiver 94 for accepting a post of an accessory and is itself attachable to the bumper 56 using a square-sectioned pin 96 which extends through upper and lower square-sectioned slots 98, 99 when the attachment bracket 92 is placed about square pocket 81 of the bumper 56. A tensioner 100 can be used to rotate the bracket 92 relative to the square pocket 81 to lock the pin 96 and remove any looseness. Also the assembly can be rigidified by taking the load off the vehicle springs using a jack 102 having a horizontal arm 104 which can be engaged in a suitable slot 106 forming part of the attachment bracket 92 (see also FIG. 5).

Figure 5:
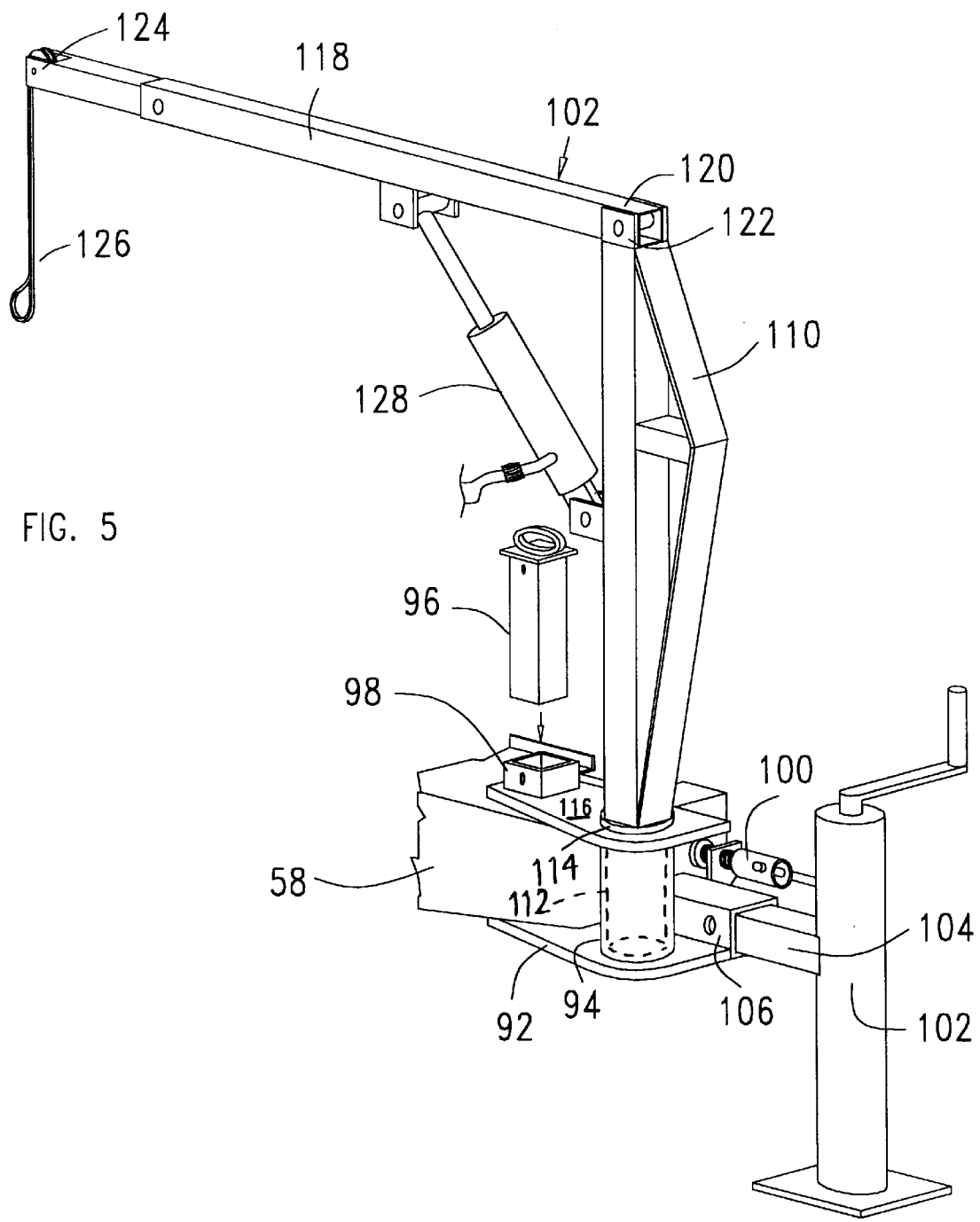
FIG. 5 is a partial isometric partial view of the bumper of FIG. 4 shown with the accessory assembled and a removable crane mounted in the accessory.

Referring to FIG. 5, the bracket 92 is shown supporting an exemplary accessory in the form of a crane 108. The crane 108 has a fabricated post 110 extending from a cylindrical base 112 (shown in broken outline) which slidingly engages in tubular receiver 94 of the attachment bracket 92. A circular flange 114 bears against a top surface 116 of the attachment bracket 92 to take the load.

The crane 108 also has an adjustable boom 118 pivotally coupled at an inner end 120 to an upper end 122 of the fabricated post 110. An outer end 124 of the boom 118 carries a lifting line 126 for attachment to an article to be hoisted onto the truck bed of the truck 20. The crane 108 is operated using a hydraulic actuator 128 to alternatively raise or lower the adjustable boom 118 during a lifting or lowering operation and the crane 108 can be rotated manually to move loads into and out of the bed of the pickup truck 20.

It should be understood that a bumper according to the present invention is adapted to accept a wide variety of vehicles accessories. Examples already described or mentioned are rear carrying racks, cranes, tow hitches, mud flaps, winches, and attachment brackets which are themselves adapted to receive other accessories including a vise and other tools. It is to be understood that there are many ways in which accessory receivers may be attached to the support frame, which receivers are adapted to accept a large variety of vehicle accessories. Accordingly, the invention may take numerous forms, all of which are within the scope of the claims.

What is claimed:

1. A bumper for a pickup truck or other utility vehicle, the bumper being for receiving and supporting an accessory, the bumper including:

an elongate rigid support frame having tubular top and bottom beams defining a central portion and the top and bottom beams converging outwardly from the central portion to define tapered side portions extending to either side of the central portion, the side portions having respective outer ends, and the top and bottom beams being rigidly attached to one another at the outer ends;

an accessory receiver rigidly coupled to said support frame adjacent one of the outer ends for receiving and supporting an accessory; and bracket members attached to the upper and lower beams for connection to a rear of a vehicle;

whereby the frame provides protection for the vehicle and exhibits strength and resistance to rotational and translational deflection when the frame is assembled on a vehicle and an accessory is in use in the receiver.

2. A bumper according to claim 1 in which the top and bottom beams define a gap in the central portion for use as a step and also to expose a vehicle licence plate.

3. A bumper according to claim 1 further including a second accessory receiver rigidly coupled to said support frame adjacent the other of said outer ends for receiving and supporting an accessory.

4. A bumper according to claim 3 in which the accessory receivers are tubular and extend about respective vertical axes.

5. A bumper according to claim 4 in which the accessory receivers are rigidly attached to the top and bottom beams.

6. A bumper according to claim 5 in which the top and bottom beams define a gap in the central portion for use as a step and to expose a vehicle licence plate.

7. A bumper according to claim 6 and further including a cover skin coupled to the support frame to cover the frame when the bumper is attached to a vehicle.

8. A bumper according to claim 7 in which the cover skin includes a licence plate guard for shielding a licence plate and an indented step.

9. A bumper according to claim 8 and further including tail light protectors coupled to the support frame at the outer ends of the support frame.

10. A bumper according to claim 3 in which the accessory receivers are rigidly attached to the top and bottom beams.

11. A bumper according to claim 1 and further including a further accessory receiver attached to and extending horizontally and forwardly of the frame for receiving a mud flap assembly.

12. A bumper according to claim 1 and further including a further accessory receiver attached to the bottom beam for receiving a tow hitch.

13. A bumper according to claim 1 and further including a cover skin coupled to the support frame to cover the frame when the bumper is attached to a vehicle.

14. A bumper according to claim 13 in which the cover skin includes a licence plate guard for shielding a licence plate.

* * * * *